US010266131B2

(12) United States Patent
Eling et al.

(10) Patent No.: US 10,266,131 B2
(45) Date of Patent: Apr. 23, 2019

(54) VEHICLE SYSTEMS AND METHODS USING USB INTERFACES

(71) Applicant: GM GLOBAL TECHNOLOGY OPERATIONS LLC, Detroit, MI (US)

(72) Inventors: Russ M. Eling, Lasalle (CA); Nathaniel H. Williams, Berkley, MI (US); Marco T. Carnevale, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 121 days.

(21) Appl. No.: 15/099,402

(22) Filed: Apr. 14, 2016

(65) Prior Publication Data
US 2017/0297512 A1    Oct. 19, 2017

(51) Int. Cl.
| | |
|---|---|
| *B60R 16/00* | (2006.01) |
| *B60R 16/023* | (2006.01) |
| *B60R 16/03* | (2006.01) |
| *B60R 25/20* | (2013.01) |
| *G06F 1/26* | (2006.01) |
| *G06F 13/42* | (2006.01) |
| *G06F 21/85* | (2013.01) |
| *G07C 5/00* | (2006.01) |
| *G06F 21/44* | (2013.01) |

(52) U.S. Cl.
CPC ............ *B60R 16/023* (2013.01); *B60R 16/03* (2013.01); *B60R 25/20* (2013.01); *G06F 1/266* (2013.01); *G06F 13/4282* (2013.01); *G06F 21/85* (2013.01); *G07C 5/008* (2013.01); *G06F 21/44* (2013.01); *G07C 2205/02* (2013.01)

(58) Field of Classification Search
CPC .................................................... B60R 16/023
See application file for complete search history.

(56) References Cited

U.S. PATENT DOCUMENTS

| | | | | |
|---|---|---|---|---|
| 9,645,962 | B2* | 5/2017 | Voto | G06F 13/4022 |
| 9,721,447 | B2* | 8/2017 | Mese | H04M 1/72519 |
| 2006/0176146 | A1* | 8/2006 | Krishan | G06F 21/32 |
| | | | | 340/5.53 |
| 2008/0024272 | A1* | 1/2008 | Fiske | E05B 47/0002 |
| | | | | 340/5.83 |
| 2011/0125601 | A1* | 5/2011 | Carpenter | G06Q 30/06 |
| | | | | 705/26.1 |
| 2011/0213506 | A1* | 9/2011 | Gamboa Tuesta | F03B 11/00 |
| | | | | 700/287 |
| 2011/0254658 | A1* | 10/2011 | Hui | E05B 7/00 |
| | | | | 340/5.2 |
| 2012/0065807 | A1* | 3/2012 | Yokota | B60R 16/023 |
| | | | | 700/298 |
| 2012/0144076 | A1* | 6/2012 | Yang | G06F 3/0346 |
| | | | | 710/63 |
| 2014/0247113 | A1* | 9/2014 | Paquin | G07C 9/00007 |
| | | | | 340/5.65 |

(Continued)

*Primary Examiner* — Truc M Do
(74) *Attorney, Agent, or Firm* — Lorenz & Kopf, LLP

(57) ABSTRACT

A control system for a vehicle is provided. The system includes a Universal Serial Bus Type-C (USB) port configured to receive a plug of a wired connection to an external system for the transfer of at least one of power or data. The system further includes a processor coupled to the USB port and configured to at least facilitate the transfer of the at least one of power or data between the vehicle and the external system via the USB port.

13 Claims, 4 Drawing Sheets

(56) References Cited

U.S. PATENT DOCUMENTS

| | | | |
|---|---|---|---|
| 2015/0311645 A1* | 10/2015 | Chang | H01R 13/6594 439/607.28 |
| 2016/0055694 A1* | 2/2016 | Saeedi | G07C 9/00087 340/5.52 |
| 2016/0079795 A1* | 3/2016 | Patterson | H01M 10/441 320/108 |
| 2016/0092393 A1* | 3/2016 | Nge | G06F 13/382 710/14 |
| 2016/0277052 A1* | 9/2016 | Sadek | H04B 1/3888 |

* cited by examiner

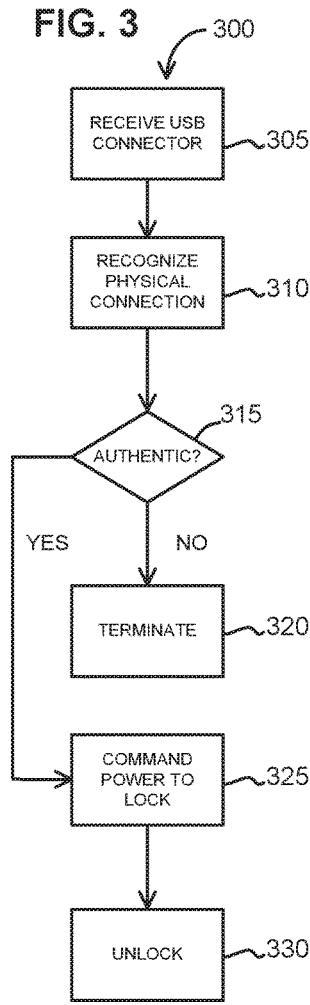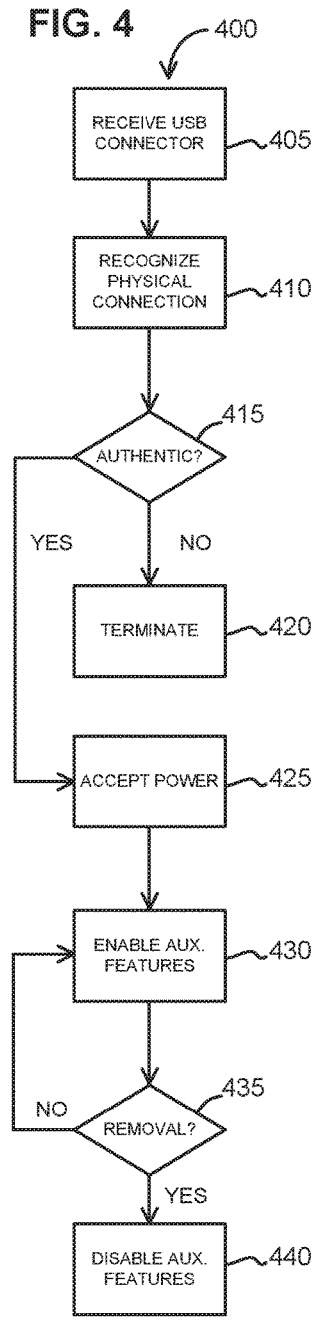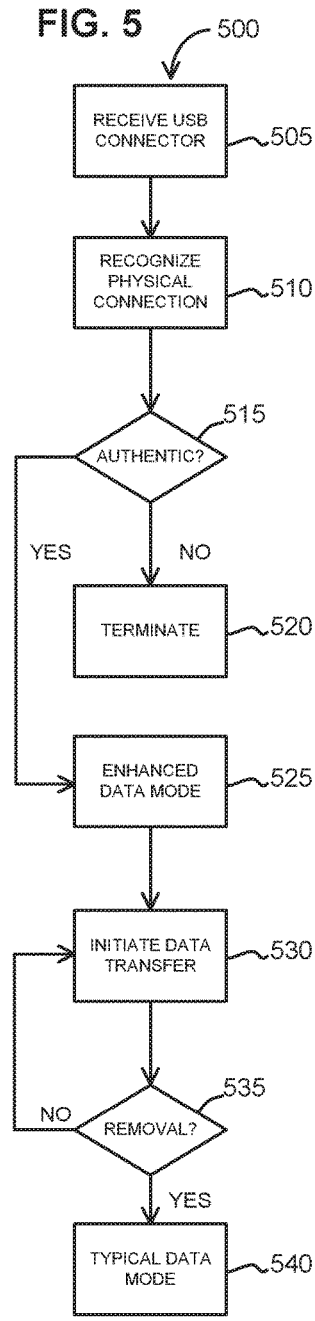

VEHICLE SYSTEMS AND METHODS USING USB INTERFACES

TECHNICAL FIELD

The present invention generally relates to vehicle systems and methods, and more particularly relates to vehicle systems and methods that use USB interfaces.

BACKGROUND OF THE INVENTION

Many vehicles today include on-board systems that perform a variety of functions, including systems that control operation of the engine, provide security and safety functions, perform diagnostic checks, provide information and entertainment services, perform navigation tasks, and facilitate communications with other vehicles, remote driver-assistance centers, and network or telematics services. Additionally, in some situations, the vehicle systems enable interaction with external systems to enhance consumer or operator experiences. Such external systems may include, for example, external power systems or consumer electronics, such as smartphones. However, despite the development of new functions, designing vehicle systems that interact and cooperate with external systems in an efficient and beneficial manner may still remain a challenge.

Accordingly, it is desirable to provide improved systems and methods for vehicle interaction with external systems. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, a control system for a vehicle is provided. The system includes a Universal Serial Bus Type-C (USB) port configured to receive a plug of a wired connection to an external system for the transfer of at least one of power or data. The system further includes a processor coupled to the USB port and configured to at least facilitate the transfer of the at least one of power or data between the vehicle and the external system via the USB port.

In accordance with another exemplary embodiment, a method is provided for managing an interface between a vehicle and an external system. The method includes receiving a Universal Serial Bus Type-C (USB) plug connected to the external system within a USB port on the vehicle; and establishing a transfer of at least one of data or power between the external system and the vehicle via the UBS plug and the USB port.

BRIEF DESCRIPTION OF THE DRAWINGS

The present invention will hereinafter be described in conjunction with the following drawing figures, wherein like numerals denote like elements.

FIGS. 3-6 are flowcharts of methods for interactions between the vehicle of FIG. 2 and an external system in accordance with exemplary embodiments.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
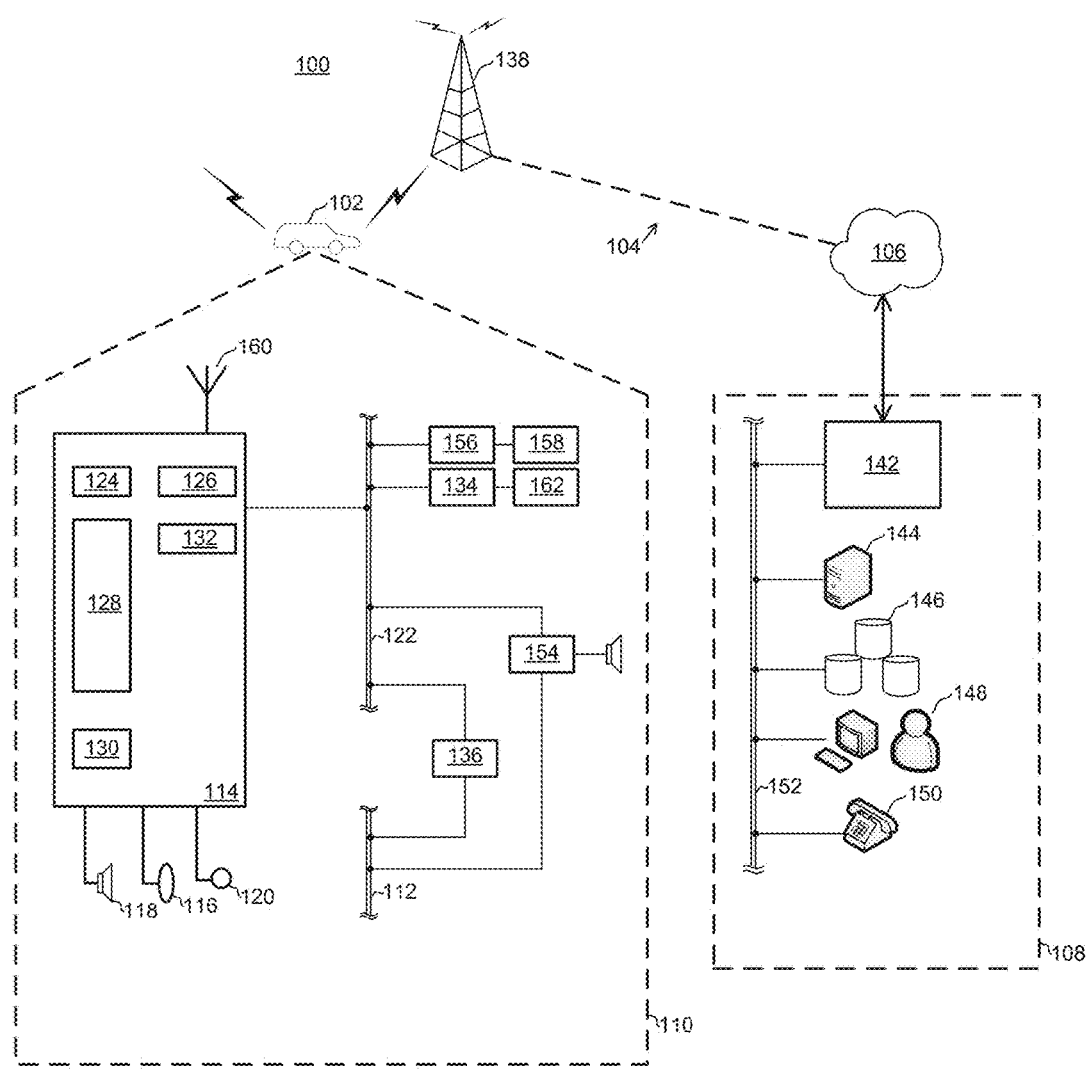
FIG. 1 is a block diagram of a vehicle-based communication network in accordance with an exemplary embodiment.

FIG. 1 is a block diagram of a vehicle system 110 associated with a vehicle 102 operating within the context of a communication system or network 100. Although the components of the vehicle system 110 may have various functions and/or be integrated into a number of other vehicle systems, the components of the system 110 interacting with the communication network 100 may be considered a vehicle network system and will be referred to below as such. In general, FIG. 1 depicts a non-limiting example of the communication network 100 that may be used together with examples of the apparatus/systems disclosed herein or to implement examples of the methods disclosed herein.

The communication network 100 generally includes or otherwise interacts with the vehicle 102, a wireless carrier system 104, a land network 106, and a call center 108. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication network 100, are not intended to be limiting.

The vehicle 102 may be any type of mobile vehicle such as a motorcycle, car, truck, recreational vehicle (RV), boat, plane, etc., and is equipped with the vehicle network system 110 containing suitable hardware and software for implementing the systems and methods described herein. One example of the vehicle network system 110 is depicted in FIG. 1, portions of which may be considered part of, or otherwise interact with, the communication network 100. As shown, the vehicle network system 110 may include a telematics unit 114 coupled to a microphone 116, a speaker 118, and buttons and/or controls 120 that may function as one or more user interfaces. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 114 is an onboard device that provides a variety of services through its communication with the call center 108, and generally includes an electronic processing device 128, one or more types of electronic memory 130, a cellular receiver 124, a wireless modem 126, a Global Navigation Satellite System (GNSS) receiver 132, and a dual mode antenna 160. In one example, the wireless modem 126 includes a computer program and/or set of software routines adapted to be executed within electronic processing device 128.

The telematics unit 114 may provide various services, including: turn-by-turn directions and other navigation-related services provided in conjunction with the autonomous driving system 190; airbag deployment notification and other emergency or roadside assistance-related services provided in connection with various crash and/or collision sensor interface modules 156 and collision sensors 158 located throughout the vehicle 102; and/or infotainment-related services where music, internet web pages, movies, television programs, videogames, and/or other content are downloaded by an infotainment center 136 operatively connected to the telematics unit 114 via vehicle bus 122 and audio bus 112. In one example, downloaded content is stored for current or later playback. The above-listed services are by no means an exhaustive list of all the capabilities of telematics unit 114, but are simply an illustration of some of the services that the telematics unit may be capable of offering. It is anticipated that telematics unit 114 may include a number of additional components in addition to and/or different components from those listed above. Additional details about the telematics unit 114 facilitating operation of an autonomous driving function are provided below.

Vehicle communications may use radio transmissions to establish a voice channel with wireless carrier system 104 so that both voice and data transmissions can be sent and received over the voice channel. Vehicle communications are enabled via the cellular receiver 124 for voice communications and the wireless modem 126 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

In one exemplary embodiment, the GNSS receiver 132 and cellular receiver 124 facilitate the navigation functions of the vehicle network system 110. In particular, the GNSS receiver 132 may include any suitable hardware and software, such as a GPS chipset/component to receive GPS data. Any type of GNSS location system may be provided to receive location information from external satellite communication systems. The cellular receiver 124 may include any suitable hardware and software, such as a cellular chipset/component to receive GNSS correction data that may be used to correct the location calculations based on the GNSS data.

The dual mode antenna 160 may facilitate communication between the telematics unit 114 and other aspects of the communication system 100, including the wireless carrier system 104, land network 106 and call center 108. Additionally, the antenna 160 may service the GNSS receiver 132 and the cellular receiver 124.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides audible output to the vehicle occupants and can be either a stand-alone speaker specifically dedicated for use with the telematics unit 114 or can be part of a vehicle audio component 154. In either event, microphone 116 and speaker 118 enable vehicle network system 110 and call center 108 to communicate with the occupants through audible speech.

The vehicle hardware also includes controls 120 for enabling a vehicle occupant to activate or engage one or more of the components of the vehicle network system 110. For example, one control 120 may be an electronic push-button used to initiate voice communication with call center 108 (whether it be a human such as advisor 148 or an automated call response system). In another example, the control 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides amplitude modulated (AM) and frequency modulated (FM) radio, compact disc (CD), digital video disc (DVD), and multimedia functionality independent of the infotainment center 136. The audio component 154 may contain a speaker system, or may utilize speaker 118 via arbitration on vehicle bus 122 and/or audio bus 112.

The collision sensor interface module 156 is operatively connected to the vehicle bus 122. The collision sensors 158 provide information to the telematics unit via the collision sensor interface module 156 regarding the severity of a vehicle collision, such as the angle of impact and the amount of force sustained.

Vehicle sensors 162, connected to various sensor interface modules 134, are operatively connected to the vehicle bus 122. Example vehicle sensors 162 include but are not limited to gyroscopes, accelerometers, magnetometers, emission detection, control sensors, and the like. Additionally, vehicle sensors 162 may interact with various other systems to collect further types of data. The data from the vehicle sensors 162 may be used by many types of vehicle systems, including powertrain control, climate control, and body control, as examples.

Wireless carrier system 104 may be a cellular telephone system or any other suitable wireless system that transmits signals between the vehicle network system 110 and land network 106. According to an example, wireless carrier system 104 includes one or more cell towers 138, as well as any other networking components required to connect the wireless carrier system 104 with land network 106. As appreciated by those skilled in the art, various cell tower/base station/MSC arrangements are possible and could be used with wireless carrier system 104.

Land network 106 can be a conventional land-based telecommunications network that is connected to one or more landline telephones, and that connects wireless carrier system 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call center 108 is designed to provide the vehicle network system 110 with a number of different system back-end functions and, according to the example shown here, generally includes one or more switches 142, servers 144, databases 146, advisors 148, as well as a variety of other telecommunication/computer equipment 150. These various call center components are suitably coupled to one another via a network connection or bus 152, such as the one previously described in connection with the vehicle network system 110. Switch 142, which can be a private branch exchange (PBX) switch, routes incoming signals so that voice transmissions are usually sent to either advisor 148 or an automated response system, and data transmissions are passed on to a modem or other piece of telecommunication/computer equipment 150 for demodulation and further signal processing. The modem or other telecommunication/computer equipment 150 may include an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a call center 108 that is manned, it will be appreciated that the call center 108 can be any central or remote facility, manned or unmanned, mobile or fixed, to or from which it is desirable to exchange voice and data.

Figure 2:
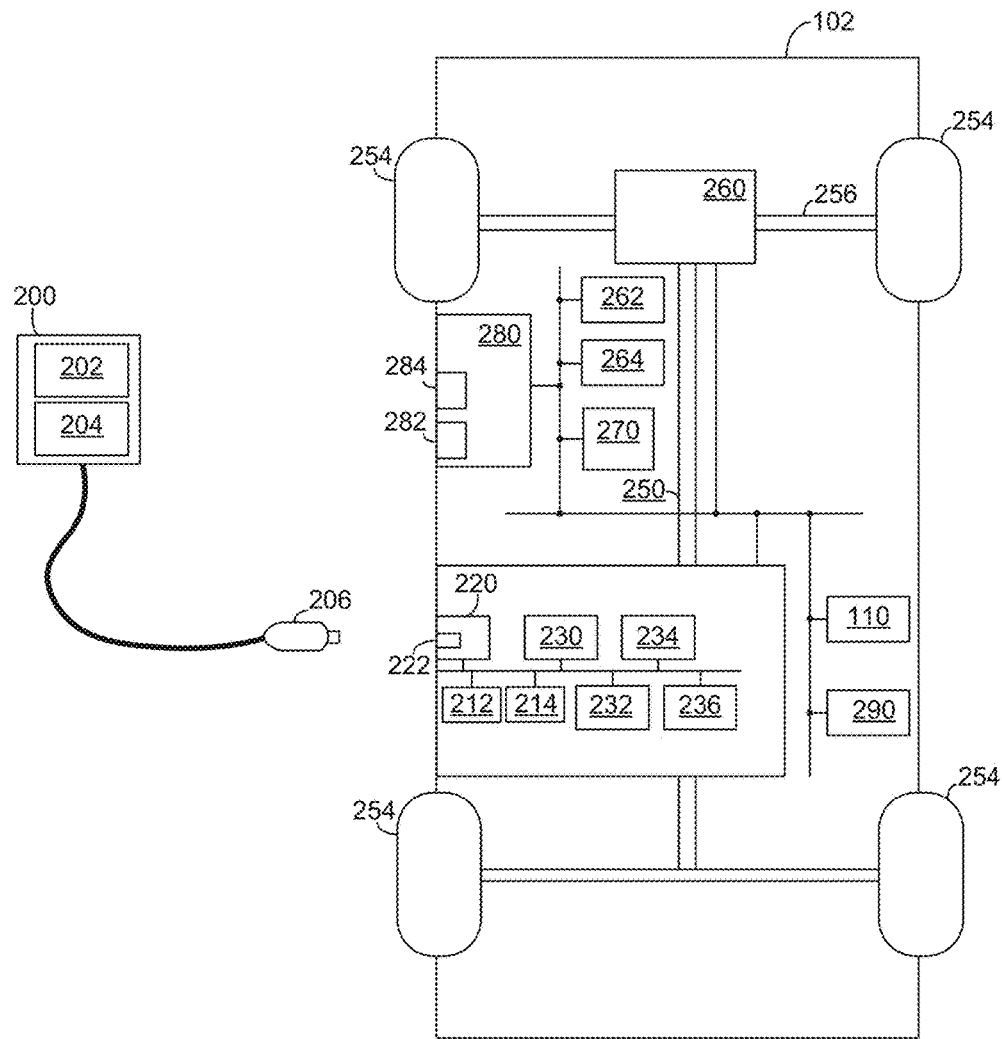
FIG. 2 is a block diagram of a vehicle that may be implemented within the network of FIG. 1 in accordance with an exemplary embodiment.
Figure 6:
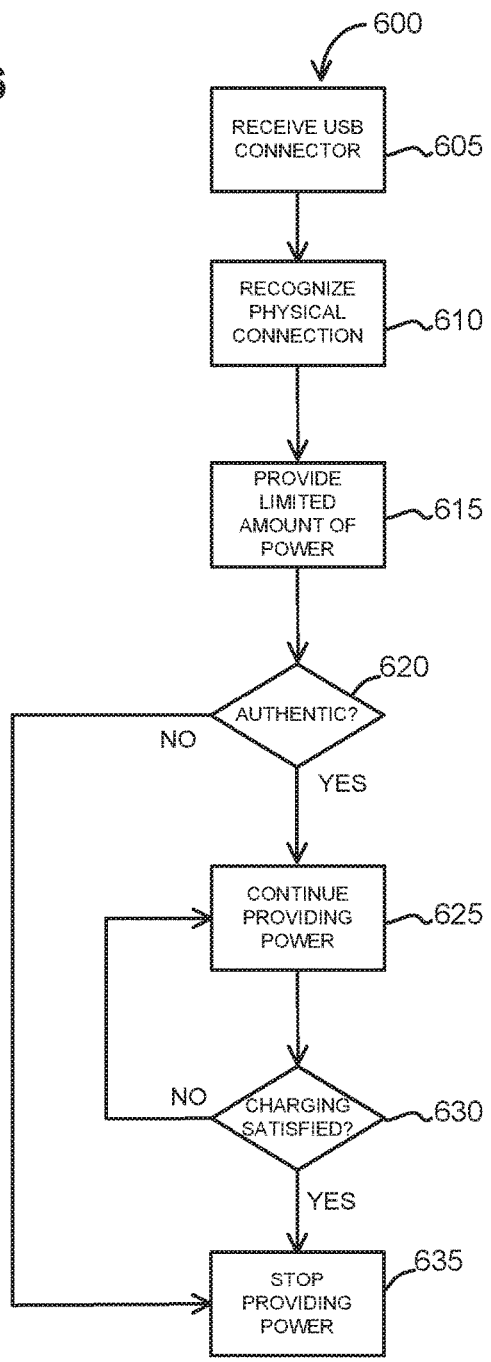

FIG. 2 is a schematic functional block diagram of certain features of the vehicle 102 in accordance with an exemplary embodiment. Generally, the features of the vehicle 102 depicted in FIG. 2 may be relevant to the exemplary embodiments described below. Although not shown and/or discussed in detail, the vehicle 102 may have any number of additional components typically used in the automotive industry.

As shown, the vehicle 102 includes the network system 110 discussed above with reference to FIG. 1. Additionally, the vehicle 102 further includes a control system 210 that enables the vehicle to interact and/or cooperatively function with an external system 200. As described in greater detail below, the external system 200 may be any type of system that exchanges data and/or power with one or more vehicle systems that are at least partially subject to management or control by the control system 210. As also discussed below, the external system 200 is electrically coupled to the vehicle 102 via a wired connection (e.g., a hardwired or direct connection).

As schematically represented in FIG. 2, the external system 200 includes at least one of a power source 202 and a data source 204, and the wired connection may take the form of a USB Type-C plug 206, which is discussed in greater detail below. The power and data sources 202, 204 may take various forms. In one example, the external system 200 is a direct power or network connection, e.g. at a home or business location. For example, the external system 200 may be a charging station such that the power source 202 is connected to the utility grid, e.g., effectively an unlimited source of power. The data source 204 of the external system 200 may be in the form of network access, such as interne access via telephone circuits, coaxial cable, fiber optic or copper wires, Wi-Fi, satellite, cellular telephone technology and/or other forms as an access point that is otherwise independent of the vehicle 102. In many situations, this data source 204 may be subject to fewer data, power, or processing restrictions than the data access provided by the network system 110.

In a further embodiment, the data source 204 may be a dedicated data storage device, such as a USB data storage device (e.g., a USB stick or USB thumb drive). In such an embodiment, the USB data storage device itself is considered a wired connection.

As another example, the external system 200 may be a mobile device, such as a smartphone or tablet. As is generally known, such mobile device may refer to a mobile telephone built on a mobile operating system with the capability of running applications and connecting to the Internet to provide a user with access to a variety of additional applications and services such as text messaging, e-mail, Web browsing, still and video cameras, MP3 player and video playback, etc. Many mobile devices typically include built in applications that can provide web browser functionality that can be used display standard web pages as well as mobile-optimized sites, e-mail functionality, voice recognition, clocks/watches/timers, calculator functionality, personal digital assistant (PDA) functionality including calendar functionality and a contact database, portable media player functionality, low-end compact digital camera functionality, pocket video camera functionality, navigation functionality (cellular or GPS), etc. In addition to their built-in functions, mobile devices are capable of running an ever growing list of free and paid applications, including dedicated applications for interacting with the vehicle 102. Typically, the mobile device is powered by a battery source. As such, a mobile device may function as the power source 202 and/or the data source 204.

The control system 210 generally functions to control operation of one of more aspects of the vehicle 102, including the various functions described below. In some embodiments, the control system 210 may be sub-divided into more than one control system and/or integrated with other, more dedicated systems. Additional details about the control system 210 will be provided below after an introduction of the other depicted aspects of the vehicle in FIG. 2.

As shown, the vehicle 102 includes a chassis 250, a body 252, four wheels 254, a steering system 262, and a braking system 264. The body 252 is arranged on the chassis 250 and substantially encloses the other components of the vehicle 102. The body 252 and the chassis 250 may jointly form a frame. The wheels 254 are each rotationally coupled to the chassis 250 near a respective corner of the body 252. In various examples the vehicle 102 may differ from that depicted in FIG. 1. For example, in certain examples, the number of wheels 254 may vary. By way of additional example, in various examples the vehicle 102 may not have a steering system.

In the example illustrated in FIG. 2, the vehicle 102 includes an actuator assembly 260. The actuator assembly 260 includes at least one propulsion system mounted on the chassis 250 that drives the wheels 254. In some exemplary embodiments, the actuator assembly 260 includes an engine, such as a combustion engine. In other examples, the actuator assembly 260 may include one or more other types of engines and/or motors, such as an electric motor/generator, instead of or in addition to the combustion engine. Generally, operation of the actuator assembly 260, steering system 262, and braking system 264 is relatively well understood and will not be described in greater detail.

As also shown in FIG. 2, the vehicle 102 includes a battery assembly 270 that functions as an energy storage device to selectively provide power to various portions of the vehicle 102. For example, the battery assembly 270 may function as a starter battery for a motor or engine of the propulsion system 260. As another example, the battery assembly 270 may function as a power source for the network system 110 described in FIG. 1, as well as other electrical equipment described below.

The vehicle 102 may further include doors 280 that allow access to the interior of the vehicle 102 by a user operating an opening device (e.g., a handle and unlatching mechanism) 282. The doors 280 are secured by a locking assembly or actuator 284 that enables or prevents operation of the opening device 282. During normal operation, the locking actuator 284 is powered by the battery assembly 270 between a locked state and an unlocked state such that, upon user authentication, the locking actuator 284 is energized to toggle between the locked and unlocked states. The user authentication may take any of numerous forms, including a key or a key fob that provides an access or identification code as the authentication. Additional mechanisms for actuating the locking actuator 284 are described below.

The vehicle 102 may further include a communications unit 290, which in some embodiments may be considered part of the network system 110. Generally, the communication unit 290 includes a transceiver (e.g., a receiver and transmitter) configured to communicate wirelessly using a pre-defined communication protocol, such as Bluetooth™ or other communication protocol, such as WiFi, with mobile communications devices. In effect, the communications unit 290 forms a "hotspot" that enables network access for a mobile communications device via the network system 110.

Generally, the control system 210 may include any suitable hardware and software for implementing the functions described below, including hardware and software embodied as an application specific integrated circuit (ASIC), an electronic circuit, input/output (I/O) devices, a processing unit (shared, dedicated, or group) and memory units. In FIG. 2, such components are generally represented by a processor 212 configured to execute one or more software or firmware programs in the form of instructions stored in memory 214 as any tangible, non-transitory processor-readable storage medium.

Although not specifically shown, the control system 210 may include or otherwise interface with a user interface that enables a user (typically, the driver) to communicate with the control system 210. Such a user interface may be realized as a display device, keypad, touchpad, keyboard, mouse, touch panel, joystick, knob, lights, line select key or another suitable device adapted to receive input from a user and/or provide information to the user, including audio input and output devices. In some exemplary embodiments, the user interface may be incorporated into the components described above, such as the microphone 116, speaker 118, controls 120, and infotainment center 136 of FIG. 1.

Additionally, the control system 210 may be organized into a number of functional modules or units that operate collectively or independently to implement functions of the vehicle 102. In one exemplary embodiment, the control system 210 includes a USB interface module 220, an authentication module 230, a power management module 232, a door lock module 234, and a systems module 236 coupled together (and/or to other vehicle components) in any suitable manner, such as a data bus.

Generally, the USB interface module 220 includes the hardware and software necessary for the control system 210 to interact with the external system 200. Specifically, the USB interface module 220 enables the control system 210 to exchange data and/or power with the external system 200. The USB interface module 220 includes a USB port 222 for direct connection to the external system 200.

The USB port 222 refers to a reversible-plug connector that operates in accordance with a USB Type-C specification. In one exemplary embodiment, the USB port 222 is a female port that receives a plug 206 with a wired connection to the external system 200. However, in other embodiments, the USB port 222 is a plug that may be used for a wired connection with a female port of the external system 200. As is typical with the USB Type-C specification, the USB port 222 includes a 24-pin double-sided connector with four power/ground pairs, two differential pairs for USB 2.0 data bus, four pairs for a high-speed data bus, two "sideband use" pins, and two configuration pins for cable orientation detection. The USB port 222 supports power output of up to 20V (100 W) and 5 A.

The USB port 222 may be positioned in any location throughout the vehicle 102. In one exemplary embodiment, the USB port 222 may be arranged such that it may be accessed from outside of the vehicle 102. In further embodiments, the USB port 222 may be arranged inside of the vehicle 102. In other embodiments, the USB interface module 220 may have a number of USB ports, e.g., one inside the vehicle 102 and one outside the vehicle 102.

As noted above, the USB interface module 220 generally functions to monitor and/or control data and power flows between the control system 210 and the external system 200 interfacing with the USB port 222. As such, the USB interface module 220 may function to recognize when a USB plug 206 from the external system 200 is placed within the USB port 222 and initiate the exchange of information to enable the systems 200, 210 to interface with one another. Additional details are provided below.

The authentication module 230 generally functions to control access to the vehicle 102 via the control system 210. Various mechanisms may be implemented by the authentication module 230 to control access. Typically, the authentication module 230 considers an identification or authorization code or token (generally, an "authentication token") that represents the identity and/or rights of the prospective operator to access the vehicle 102. In some situations, such an authentication token may be provided by a user outside or inside of the vehicle 102, while in other situations, the authentication token may be received via the networking system 110 from the communications system 100, e.g., from a call center 108 of the communication network 100. As such, the authentication module 230 receives an authentication token and confirms that the authentication token is valid for interacting with the vehicle by comparing the authentication token to a list of acceptable tokens. As described below, the user may additionally provide the authentication token to the authentication module 230 via the external system 200.

The power management module 232 generally controls the distribution of power throughout the vehicle 102. In particular, the power management module 232 may control the charging and discharging of the battery assembly 270. For example, the power management module 232 selectively enables the battery assembly 270 to power various components of the network system 110. The power management module 232 may also measure and/or derive the level of charge in the battery assembly 270 for efficient management of energy storage and use. In some exemplary embodiments, the power management module 232 enables the battery system 270 to provide power to the external system 200 and to receive power from the external system 200. Additional aspects of the power management module 232 are described below.

The door lock module 234 generally functions to control operation of the locking actuator 284. For example, the door lock module 234 may command the locking actuator 284 to toggle between the locked and unlocked states, e.g., to lock and unlock the door 280. In some instances, the door lock module 234 perform this function based on various inputs or parameters, such as when presented with an acceptable key fob in proximity to the vehicle 102 or when presented with an acceptable identification or authorization code. In one exemplary embodiment, the door lock module 234 may operate based on commands from the authentication module 230 that functions to authenticate prospective users.

In one exemplary embodiment, the power management module 232 selectively enables the battery assembly 270 to power the locking actuator 284, e.g., to unlock and lock the doors 280. In a further exemplary embodiment, the power management module 232 selectively enables the external system 200 to power the locking actuator 284, as descried in greater detail below.

In another exemplary embodiment, the external system 200 may operate as the data source 204 and provide the identification or authorization code to actuate the door lock module 234. In other words, the external system 200 may function as a key or key fob. In such embodiments, the external system 200 may additionally function as a power source 202 or only as the data source 204 to provide the identification or authorization code. For example, the external system 200 may be in the form of a USB data drive.

The systems module 236 generally functions to enable and disable various features or aspects of the control system 210 and other systems of the vehicle 102.

In one exemplary embodiment, the systems module 236 may operate the various systems of the vehicle in one or more power modes. For example, the systems module 236 may command the power management module 232 to operate the vehicle 102 is a full power mode when the vehicle 102 is being driven. In some instances, the full power mode may be desired to provide the operator with full access to all functions of the vehicle 102, e.g., for safety or operational purposes. The systems module 236 may command the power management module 232 to further operate the vehicle 102 in a reduced power mode. In some instances, the reduced power module may be desired to conserve battery power, e.g., when the vehicle is parked. In the reduced power mode, certain vehicle systems may be disabled to conserve power, particularly aspects not directly related to driving, such as the communications unit 290. In one exemplary embodiment, the vehicle systems that may be disabled in the reduced power mode are referred to as auxiliary features. The auxiliary features may include, as examples, the telematics unit 114, infotainment center 136, and communications unit 290.

In accordance with one exemplary embodiment, the systems module 236 may modify the power mode when connected to the external system 200. For example, the systems module 236 may command the power management module 232 to operate the vehicle 102 in the full power mode, even when the conditions would otherwise warrant the reduced power mode. As another example, the systems module 236 may command the power management module 232 to operate the vehicle 102 in an intermediate power mode, even when the conditions would otherwise warrant the reduced power mode. As noted above, the external system 200 may provide an external power source 202 that, when connected via the USB interface module 220, prevents undue charge depletion of the battery system 270. In one exemplary embodiment, the power source 202 provides current directly to the auxiliary features, and in further embodiments, the power source 202 charges the battery system 270, which in turn powers the auxiliary features.

As such, the systems module 236 enables enhanced operation of the auxiliary features, even at times at which such systems would be otherwise disabled. As an example, this enables operation of the communication unit 290 as a Wi-Fi access point, even when the vehicle 102 is not being operated or when the battery system 270 has a low charge.

In one exemplary embodiment, the systems module 236 may operate the various systems of the vehicle in one or more data update modes. Such data update modes may generally dictate the size of the data updates that may be received and implemented by the vehicle 102. For example, the network system 110 of the vehicle 102 may interact with the network 100 to download software updates, e.g. for improved function, regular maintenance, diagnostics, and the like. In vehicles that are operated on a regular basis, these software updates may be relatively frequent and/or small and are generally unnoticed by an operator. However, when a vehicle 102 goes for a long period of time without being operated and/or connected to the network 100, the software updates may accumulate. If the software updates grow to a certain size, it may take a long time for the vehicle 102 to download and implement, which may result in unacceptable delays from the perspective of the operator. As such, the systems module 236 may typically operate in a limited data update mode to prevent a large amount of data from being downloaded and implemented within one time period.

However, upon connection to the external system 200 via the USB interface module 220, the systems module 236 may operate in a full data mode in which all available software updates are downloaded. In particular, the wired connection provided by the USB interface module 220 to the data source 204 of the external system 200 may be faster or more efficient than downloads via the network system 110. In general, the data modes may also be a function of and/or be impacted by the power modes discussed above. In other words, the systems module 236 may enable the downloading of data in situations in which such data transfers were typically unavailable due to battery conservation. As such, the data modes and power modes may be implemented in conjunction within one another by the systems module 236 in order to allow for efficient systems operation from both data and power perspectives.

As a result of the direct connection with the external system 200, the control system 210 has the ability to provide enhanced interaction and cooperation with the external system 210. Exemplary embodiments of such interaction are described below with reference to FIGS. 3-6, which are flowcharts of exemplary methods 300, 400, 500, 600 of vehicle operations that may be implemented by the external system 200.

With continuing reference to FIGS. 1-2, FIG. 3 is a flowchart of a method 300 for unlocking a vehicle 102. In a typical scenario, a prospective vehicle operator unlocks the vehicle 102 with a key, key fob, or some other type of token. For example, the operator uses a key fob to send a short range wireless signal to a door lock module 234 representing an authentication token, and upon authentication, the door lock module 234 energizes a door lock actuator 284 with power from the battery system 270 to unlock the vehicle 102. However, this process requires the battery system 270 to have sufficient charge to power the door lock actuator 284. In some instances, the battery system 270 may be unable to provide such power. As such, the method 300 is particularly applicable in a situation with the charge of the battery system in the vehicle is insufficient to unlock the doors.

In a first step 305, the USB port 222 receives a USB connector 206 extending from an external system 200. Generally, the USB port 222 is positioning on the exterior of the vehicle 102 such that a prospective operator may initiate the method 300 when the vehicle doors 280 are locked and the interior of the vehicle 102 is inaccessible. In this instance, the external system 200 is a mobile phone or tablet operated by the prospective operator.

In step 310, the USB interface module 220 recognizes the presence of a physical connection between the vehicle 102 and the external system 200 with a power source 202 and initiates operation of the vehicle control system 210. In one exemplary embodiment, the USB interface module 220 establishes communication between the control system 210 and the external system 200 in accordance with the USB Type-C protocol.

In some instances, the external system 200 may attempt to provide power through the physical connection to the vehicle 102. In such an instance, in step 315, the control system 210 commands the power management module 232 to absorb or otherwise prevent any power transmitted from the external system 200 from powering any vehicle system, particularly the door lock actuator 284. If no power is provided through the USB port 222 from the external system 200, then this step may be omitted.

In step 315, the control system 210 exchanges an authentication protocol with the external system 200. In one embodiment, the authorization module 230 sends an authentication request to the external system 200 and receives an authentication response from the external system 200. The authentication response may include an authentication code or token (generally, an "authentication token") that represents the identity and/or rights of the prospective operator as authorization to access the vehicle. The authentication module 230 may compare the authentication token to a predetermined list of acceptable tokens. In one exemplary embodiment, the list of acceptable tokens may be locally stored on the control system 210. In other embodiments, the authentication token may be confirmed via the external call center 108 of the communication system 100.

If the authentication token is unacceptable, the authentication module 230 refuses access to the vehicle in step 320 and the method 300 terminates. In some embodiments, the control module 210 may generate a notification message that is sent to the external system 200 via the USB port 222.

If the authentication token is acceptable, the method 300 proceeds to step 325 in which the control system 210 commands power to the door lock actuator 284. In step 330, the door lock actuator 284 unlocks the vehicle door 280 and enables operator access to the interior of the vehicle 102.

With continuing reference to FIGS. 1-3, FIG. 4 is a flowchart of a method 400 for enabling auxiliary features of the vehicle 102. In a first step 405, the USB port 222 receives a USB connector 206 extending from an external system 200. In step 410, the USB interface module 220 recognizes the presence of a physical connection between the vehicle 102 and the external system 200 with a power source 202 and initiates operation of the vehicle control system 210. In one exemplary embodiment, the USB interface module 220 establishes communication between the control system 210 and the external system 200 in accordance with the USB Type-C protocol.

In step 415, the control system 210 exchanges an authentication protocol with the external system 200, as described above. If the authentication token is unacceptable, the authentication module 230 refuses access to the vehicle 102 in step 420 and the method 400 terminates. If the authentication token is accepted, the method 400 proceeds to step 425. In some embodiments, the authentication steps 415, 420 may be omitted.

In step 425, the power management module 232 accepts power from the power source 202 of the external system 200. Such power may be used to charge the battery system 270 or to power vehicle systems directly.

In step 430, the systems module 236 enables all or selected the auxiliary features, even if such auxiliary features were previously disabled. In step 435, the systems module 236 continues enablement until removal of the direct connection to the external system 200, at which time the systems module 236 reverts to typical power management modes in step 440.

With continuing reference to FIGS. 1-4, FIG. 5 is a flowchart of a method 500 for enabling enhanced data transfer to the vehicle 102. In a first step 505, the USB port 222 receives the USB connector 206 extending from an external system 200. In step 510, the USB interface module 220 recognizes the presence of a physical connection between the vehicle 102 and the external system 200 with a data source 204 and initiates operation of the vehicle control system 210. In one exemplary embodiment, the USB module establishes communication between the control system 210 and the external system 200 in accordance with the USB Type-C protocol.

In step 515, the control system 210 exchanges an authentication protocol with the external system 200, as described above. If the authentication token is unacceptable, the authentication module 230 refuses access to the vehicle 102 in step 520 and the method 500 terminates. If the authentication token is accepted, the method 500 proceeds to step 525. In some embodiments, the authentication steps 515, 520 may be omitted.

In step 525, the systems module 236 enables operation in an enhanced data mode in which data transfers are unlimited or at least increased relative to typical data transfers via the network system 110. In step 530, the systems module 236 initiates data transfer between the data source 204 of the external system 200 and the vehicle 102. Typically, this data transfer is in the form of software updates that may be more efficiently and quickly transferred and implemented than otherwise possible during typical operation. In step 535, the systems module 236 continues enablement until removal of the direct connection to the external system 200, at which time the systems module 236 reverts to typical data management modes in step 540.

With continuing reference to FIGS. 1-5, FIG. 6 is a flowchart of a method 600 for charging an external system 200 with the battery system 270 of the vehicle 102. In a first step 605, the USB port 222 receives a USB connector 206 extending from the external system 200. In step 610, the USB interface module 220 recognizes the presence of a physical connection between the vehicle 102 and the external system 200 with a power source 202 and initiates operation of the vehicle control system 210. In one exemplary embodiment, the USB interface module 220 establishes communication between the control system 210 and the external system 200 in accordance with the USB Type-C protocol.

In step 615, the power management module 232 provides a limited amount of power to the external system 200, e.g., to provide a limited charge to a battery of the external system 200. Generally, the amount of power is sufficient to enable the external system 200 to authenticate in the following steps.

In step 620, the control system 210 exchanges an authentication protocol with the external system 200, as described above. If the authentication token is unacceptable, the control system 210 ceases providing power to the external system 200 and the method 600 terminates in step 635.

If the authentication token is accepted, the method 600 proceeds to step 625 in which the power management module 232 continues providing power to the external system 200. In step 630, the control system 220 evaluates the charging conditions. In some exemplary embodiments, the charging conditions are a function of the charge of the battery system 270 and/or the charge of the power source 202 of the external system 200. If the charge of the battery system 270 reaches a level that may impact operation of the vehicle 102, the power management module 232 may stop charging the power source 202 of the external system 200. Similarly, if the power source 202 of the external system reaches a predetermined high level, the power management module 232 may stop charging the power source 202 of the external system 200. If the charge conditions remain acceptable, the power management module 232 continues charging the power source 202 of the external system 200. However, if the charge conditions are deemed to be unacceptable, the power management module 232 stops charging the power source 202 of the external system 200 in step 635.

As a result, exemplary embodiments discussed herein provide systems and methods that improve the operation of vehicle systems. For example, the exemplary embodiments provide improvements with respect the vehicle interaction and cooperation with an external system via a USB Type-C connection that enhances operator experience and vehicle functionality.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the description above includes a general context of computer-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein, various such structures may be separated or combined in various combinations across the various computing platforms described herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control system for a vehicle, comprising:
  a Universal Serial Bus (USB) Type-C port configured to receive a plug of a wired connection to an external system for a transfer of at least one of power or data;

a processor coupled to the USB Type-C port and configured to at least facilitate the transfer of the at least one of power or data between the vehicle and the external system via the USB port;

an authentication module coupled to the USB Type-C port and the processor, the authentication module configured to authenticate the external system to enable the transfer of the at least one of power or data between the vehicle and the external system via the USB Type-C port;

a door lock module coupled to the USB Type-C port and the authentication module, wherein, upon authentication by the authentication module, the door lock module is configured to use power from the external system to energize a door lock actuator to unlock a vehicle door; and a systems module coupled to the USB Type-C port and configured to enable auxiliary vehicle features based on power from the external system.

2. A control system for a vehicle, comprising:

a Universal Serial Bus (USB) Type-C port configured to receive a plug of a wired connection to an external system for the transfer of at least one of power or data;

a processor coupled to the USB Type-C port and configured to at least facilitate the transfer of the at least one of power or data between the vehicle and the external system via the USB Type-C port; and a power management module coupled to the USB Type-C port and configured manage a vehicle battery system, wherein the power management module is configured to charge the vehicle battery system with power from the external system via the USB Type-C port.

3. The control system of claim 1, further comprising a systems module coupled to the USB Type-C port and configured to control vehicle systems updates, wherein the systems module is configured to receive the vehicle systems updates from the external system via the USB Type-C port.

4. A method of managing an interface between a vehicle and an external system, comprising:

receiving a Universal Serial Bus (USB) Type-C plug connected to the external system within a USB Type-C port on the vehicle;

establishing a transfer of at least one of data or power between the external system and the vehicle via the UBS Type-C plug and the USB Type-C port;

requesting authentication of the external system;

establishing, prior to receiving an authentication response, the transfer in the form of a limited amount of power from the vehicle to the external system;

maintaining, if the authentication response is acceptable, the transfer of power from the vehicle to the external system; and terminating, if the authentication response is unacceptable, the transfer of power from the vehicle to the external system.

5. The method of claim 4, wherein the receiving step includes receiving the USB Type-C plug that is connected to a mobile device as the external system, the mobile device being at least one of a smartphone or tablet.

6. The method of claim 4, further comprising enabling auxiliary vehicle features by using the transfer to power the auxiliary vehicle features from the external source.

7. The method of claim 6, further comprising disabling the auxiliary vehicle features upon disconnection of the USB Type-C plug from the vehicle port.

8. The method of claim 4, further comprising enabling software updates with the transfer of data from the external system.

9. The control system of claim 2, wherein the external system is a utility power source.

10. The control system of claim 2, further comprising a door lock module coupled to the USB Type-C port and the authentication module, wherein, upon authentication by the authentication module, the door lock module is configured to use power from the external system to energize a door lock actuator to unlock a vehicle door.

11. The control system of claim 2, further comprising a systems module coupled to the USB Type-C port and configured to enable auxiliary vehicle features based on power from the external system, the auxiliary vehicle features including at least one of a vehicle communications unit, a vehicle telematics unit, or a vehicle infotainment center.

12. The control system of claim 1, wherein the auxiliary vehicle features include at least one of a vehicle communications unit, a vehicle telematics unit, or a vehicle infotainment center.

13. The method of claim 7, wherein the auxiliary vehicle features include at least one of a vehicle communications unit, a vehicle telematics unit, or a vehicle infotainment center.

* * * * *